United States Patent [19]

Rand et al.

[11] Patent Number: 4,895,422
[45] Date of Patent: Jan. 23, 1990

[54] PHASE-MATCHABLE, SINGLE-MODE FIBER-OPTIC DEVICE

[75] Inventors: Stephen C. Rand, Ann Arbor, Mich.; Robert A. Cronkite, Westlake Village, Calif.

[73] Assignee: The United States of America as represented by the Secretary of the Air Force, Washington, D.C.

[21] Appl. No.: 283,699

[22] Filed: Dec. 13, 1988

[51] Int. Cl.$^4$ .............................................. G02F 1/35
[52] U.S. Cl. .................................. 350/96.15; 307/430; 350/96.29
[58] Field of Search ................................ 307/425–430; 350/96.15, 96.16, 96.29, 96.30, 96.34

[56] References Cited

U.S. PATENT DOCUMENTS

| | | | |
|---|---|---|---|
| 3,811,912 | 5/1974 | Ramaswamy | 350/96.34 X |
| 4,386,822 | 6/1983 | Bergh | 350/96.15 |
| 4,695,123 | 9/1987 | Chang et al. | 350/96.15 |
| 4,721,352 | 1/1988 | Sorin et al. | 350/96.15 |
| 4,729,622 | 3/1988 | Pavlath | 350/96.15 |

FOREIGN PATENT DOCUMENTS

| | | | |
|---|---|---|---|
| 0196382 | 10/1986 | European Pat. Off. | 350/96.15 |
| 3011663 | 10/1981 | Fed. Rep. of Germany | 350/96.29 |

Primary Examiner—John D. Lee
Attorney, Agent, or Firm—Robert L. Nathans; Donald J. Singer

[57] ABSTRACT

A nonlinear fiber-optic device including a single mode optical fiber having a longitudinal axis, for transmitting light therethrough of a given wavelength, and having a core and a cladding layer, a portion of the cladding layer being removed until a remaining portion of the cladding layer has a thickness of about one half of the given wavelength or less, and a nonlinear optical crystal having an optical axis, in contact with said remaining portion of the cladding layer, the optical axis of the crystal being substantially perpendicular to the longitudinal axis of the fiber.

6 Claims, 1 Drawing Sheet

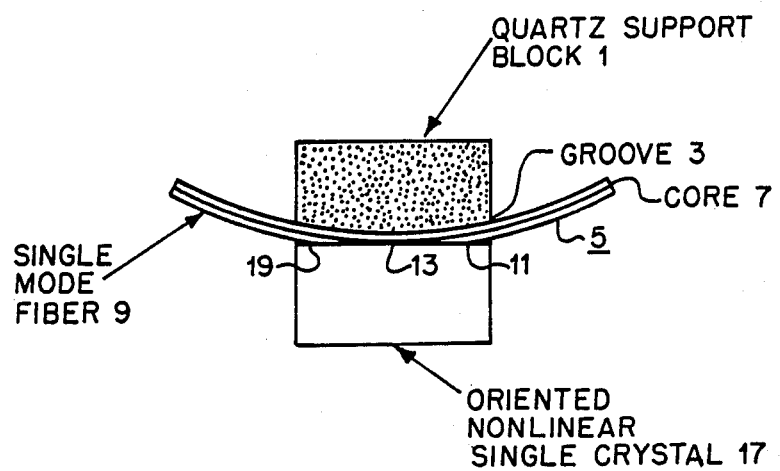

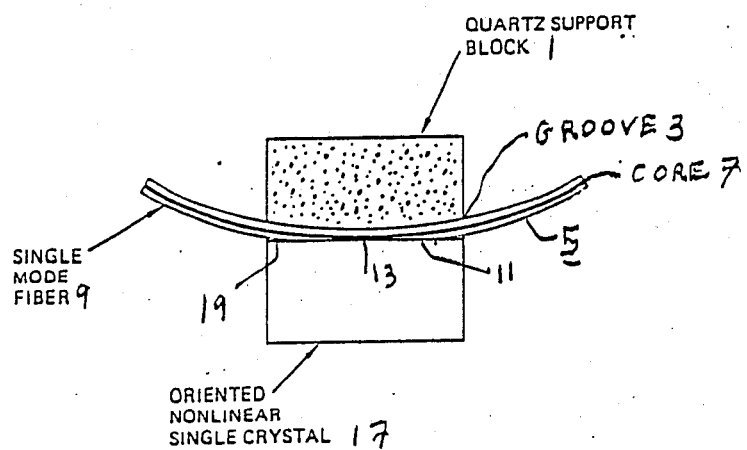

PHASE-MATCHABLE, SINGLE-MODE FIBER-OPTIC DEVICE

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of fiber-optics.

Previous nonlinear fiber devices relied on phase-matched, third order effects (cf. R. Stolen and J. Bjorkhjolm, IEEE J.Q.E. QE-18, 1062 (1982) or were not phase-matched at all (cf. C. Koster, IEEE J.Q.E. QE-2, 580 (1966) and E. S. Goldburt and P. Russell, Appl. Phys. Lett. 46,338 (1985) and T. Bridges, A. Chraplyvy, J. Bergman and R. Hart, Opt. Lett. 6, 632 (1981). No phase-matched, second order processes like frequency doubling or three-wave parametric mixing have been publicized. Although planar waveguides have been used previously for second harmonic generation (cf. G. Hewig and K. Jain, J. Appl. Phys. 59, 57 (1983)), these devices have mode structures and refractive indices poorly matched to fiber optic systems, as well as low efficiencies.

It is an object of the present invention to produce a device which facilitates efficient, second-order nonlinear optical mixing of low power, coherent light sources and frequency doubling encoding, in fiber-optic systems, and to provide efficient modulators, and parametric amplifiers which are second-order in the optical fields. Prior art devices have produced only linear optical devices in which properties dependent on a single field amplitude or third (or higher) order field amplitudes. The device of the present invention provides phase-matched output dependent on only two field amplitudes.

One important application of the present invention is to double the frequency of IR laser light, having a wavelength of, for example, 1.3–1.5 microns, transmitted through a fiber before it illuminates a detector which functions more efficiently at the doubled frequency. Another application is to encode data by frequency doubling to thwart unauthorized tapping of the data.

SUMMARY OF THE INVENTION

The low light loss nonlinear device of the present invention comprises a nonlinear optical crystal in contact with a cladding layer portion of a single mode optical fiber, the cladding layer portion having a thickness of about $\frac{1}{4}$ of the wavelength of light transmitted through the fiber, and the optical axis of the crystal being substantially perpendicular to the length of the fiber, so that the harmonic remains coherent with the fundamental to provide for high efficiencies. In accordance with one method of making the device, a single-mode polarization-preserving optical fiber is epoxied into a groove in a quartz block as described by Bergh et al.; IEEE Electr. Lett. 16, 260 (1980) and polished to partially remove a surface portion of the fiber core over a length of several millimeters. A nonlinear optical crystal, with a refractive index for the fundamental polarization which is slightly less than that of the core glass, is placed in contact with the exposed core region. The evanescent field of light propagating in the fundamental mode then creates a nonlinear polarization in the crystal which can be phase-matched at a particular wavelength determined principally by core diameter, and the mode index of the second harmonic mode. This polarization then radiates into the selected phase-matched, guided mode of the fiber at the second harmonic frequency.

Other objects, features and advantages of the present invention will become apparent upon study of the following description taken in conjunction with the sole FIGURE illustrating the various components in cross section.

DETAILED DESCRIPTION OF A PREFERRED EMBODIMENT

Referring to the sole FIGURE, a quartz support block 1 having a groove or slot 3 formed therein is provided, and a single mode optical fiber 9 is epoxied or otherwise cemented within groove 3. The portion of quartz support block 1 containing groove 3 and optical fiber 9, is ground and thereafter polished until cladding 5 is worn away to expose a portion of core 7, at 13. This process is similar to the process described by Bergh et al. in the IEE article cited above.

Polishing is preferably concluded when several millimeters of cladding is partially removed at portion 13. The aforesaid oriented nonlinear single crystal 17, having a flat surface 19, is thereafter maintained in contact with the lower portion of fiber 9 as illustrated in the FIGURE to produce the aforesaid improved device. The evanescent field of light propagating in the fundamental mode then creates a nonlinear polarization in the crystal 17 which can be phase-matched at a particular wavelength determined principally by core diameter, and the mode index of the second harmonic mode.

Other factors which may influence the phase-matching conditions are light polarization, temperature or applied bias voltages. For a PK3 glass core approximately 5 micro-meters in diameter and an ADP (ammonium dihydrogen phosphate) crystal oriented with optic axis perpendicular to the fiber, the phase-matching wavelengths for second harmonic generation (SHG) in the lowest order SHG modes occur between 0.75–1.5 micro-meters at room temperature. The density of phase-matching points increases between 0.75–1.0 micro-meters where the mode indices increase. While only ADP was tested, it is believed that KDP and other selected organic polymers will produce good results. Thus, the ADP crystal is oriented with its optical axis perpendicular to the axis of the fiber to achieve a noncritical phase-matching geometry, to maximize the nonlinear interaction by extending the length of the core region over which the second harmonic lightwave remains coherent with the fundamental wave. Epitaxial crystal growth on the fiber or deposition of amorphous or polycrystalline solids thereon followed by annealing or polishing may be employed to render the deposited material nonlinear.

While there has been described what is at present considered to be the preferred embodiments of this invention, it will be obvious to those skilled in the art that various changes and modifications may be made therein without departing from the invention and it is, therefore, intended in the appended claims to cover all such changes and modifications as fall within the true spirit and scope of the invention, including art recognized equivalents.

What is claimed is:

1. A nonlinear fiber-optic device comprising:
   (a) a single mode optical fiber having a longitudinal axis, for transmitting light therethrough of a given wavelength, and having a core and a cladding layer, a portion of said cladding layer being removed until a remaining portion of said cladding layer has a thickness of about one half of said given wavelength or less; and
   (b) a nonlinear optical crystal having an optical axis, in contact with said remaining portion of said cladding layer, the optical axis of said crystal being substantially perpendicular to the longitudinal axis of said fiber.

2. The device of claim 1 wherein said remaining portion of said cladding lyaer has a thickness of about one quarter of said given wavelength of light transmitted through said optical fiber.

3. The device of claim 1 wherein said nonlinear optical crystal comprises ADP.

4. The device of claim 2 wherein said nonlinear optical crystal comprises ADP.

5. The device of claim 1 wherein said nonlinear optical crystal comprises KDP.

6. The device of claim 2 wherein said nonlinear optical crystal comprises KDP.

* * * * *